United States Patent Office 3,644,610
Patented Feb. 22, 1972

---

3,644,610
BIAXIALLY ORIENTING CRYSTALLIZED POLYETHYLENE - 1:2 - DIPHENOXYETHANE-4:4'-DICARBOXYLATE
Richard Harold Barclay Buteux, Welwyn Garden City, England, assignor to Imperial Chemical Industries Limited, London, England
No Drawing. Continuation-in-part of application Ser. No. 717,960, Apr. 1, 1968. This application Mar. 24, 1970, Ser. No. 22,383
Claims priority, application Great Britain, Apr. 20, 1967, 18,285/67
Int. Cl. B29d 7/24
U.S. Cl. 264—289                                2 Claims

ABSTRACT OF THE DISCLOSURE

Balanced biaxially oriented sheets of polyethylene-1:2-diphenoxyethane-4:4'-dicarboxylate are made by stretching crystallized sheets 1.2 to 4× equally in each direction at a temperature in the range 70–200° C. Crystallization to an extent of 10–30% based on 100% theoretical is induced by heating at a temperature in the range 80–245° C.

---

This is a continuation-in-part of prior U.S. application, Ser. No. 717,960, filed Apr. 1, 1968, now abandoned.

This invention relates to new oriented sheets and to processes for their production.

For many applications it is desirable to provide thermoplastic sheet of thickness from 0.0075 inch to 0.1000 inch which, in addition to having high mechanical strength and stiffness and a good surface finish, maintains its original dimensions at elevated temperatures, e.g. up to 200° C. Such a sheet could be used for many applications for which a thermoplastic sheet of lower dimensional stability would be unsuitable. It is also desirable to produce such a sheet which can be formed into shaped articles either at elevated temperatures, e.g. 60° C. to 150° C. by techniques such as vacuum forming and hot moulding or at room temperatures by methods such as pressing, cupping, ironing or sinking which are well known in working sheet metal. Such shaped articles would retain the dimensional stability of the sheet from which they were formed in addition to having a high tensile strength, modulus, and impact resistance. For outdoor applications it is also desirable that the film should have a high resistance to degradation by ultra-violet light.

In order to produce oriented sheets of thickness from 0.0075 to 0.1000 inch by a process involving extrusion of the molten polymer into a sheet followed by biaxial orientation by drawing in two directions it is necessary to extrude a sheet having an as-cast thickness roughly within the range of about 0.5 to 1.0 inch depending on the draw ratios employed since the effect of drawing is to diminish the thickness of the sheet. Polyethylene terephthalate is drawn to produce biaxially oriented film. The drawing operations must be effected on amorphous film. Crystalline film cannot be drawn since it is brittle and breaks under the drawing loads applied to it. As polyethylene terephthalate has a high rate of crystallisation at elevated temperatures it is normally quenched rapidly after extrusion to obtain film in its amorphous state. The ability to quench the core of thick polyethylene terephthalate film or sheet is restricted by the thermal conductivity of the polymer. Therefore, in practice it is not possible to quench films of polyethylene terephthalate to a uniform amorphous condition which are thicker than 0.150 inch in the as-cast state.

It has now surprisingly been found that sheets of polyethylene - 1:2 - diphenoxyethane - 4:4'-dicarboxylate can be drawn in the crystalline or partially crystalline condition without any tendency to break. Therefore, an object of the present invention is to produce sheets of thickness 0.0075 to 0.1000 inch thickness from such polymer.

It is another object of the present invention to produce such high strength, dimensionally stable sheets. A further object of the invention is to provide such sheets capable of being formed into shaped articles.

According to this invention such sheets may be produced from polyethylene - 1:2 - diphenoxyethane-4:4'-dicarboxylate, which has the formula

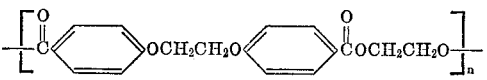

where $n$ is an integer greater than one. This polymer has already been disclosed and processes for its preparation proposed in British patent No. 579,462. One process of preparing the polymer is by effecting an ester interchange between an ester e.g. the dimethyl or diethyl ester, of diphenoxyethane-4:4'-dicarboxylic acid and excess ethylene glycol by heating at about 197° C. in a nitrogen atmosphere and in the presence of a metal catalyst, such as an alkali or alkaline earth metal. The reaction is continued until most of the alcohol has been removed. Excess glycol is then removed by distillation and the residue heated at about 280° C. in vacuo or a nitrogen atmosphere to yield the polymer. As an alternative to the ester interchange reaction a direct esterification process may be employed in which diphenoxyethane-4:4'-dicarboxylic acid is heated at about 197° C. with ethylene glycol. The invention is not limited to the preparation of the polymer by the above techniques; indeed any other process of making the polymer may be employed.

According to the present invention we provide sheets of thickness 0.0075 to 0.1000 inch of polyethylene-1:2-diphenoxyethane-4:4'-dicarboxylate having tensile yield strengths of at least 10,000 p.s.i., prefreably at least 20,000 p.s.i. and tensile moduli of at least $0.4 \times 10^6$ p.s.i. preferably at least $0.8 \times 10^6$ p.s.i. and with a shrinkage when heated for 1 minute at 200° C. of less than 1%, these qualities being in all directions in the plane of the sheet, said sheet also being resistant to degradation by heat and by ultra-violet light as hereinafter described.

These sheets may be produced by a process in which an appropriately thick polyethylene-1:2-diphenoxyethane-4:4'-dicarboxylate sheet depending on the draw ratio used is cold drawn, i.e. in the solid state at least 1.2 times in both its machine and transverse directions to an extent such that its tensile strengths are effectively equal in both directions (hereinafter referred to as balanced sheet) and the sheet is not broken, the drawing being at a temperature which allows the sheet to draw without the formation of voids but with a change of the refractive index of the sheet, the sheet being maintained before it is drawn at a temperature sufficient to cause the polymer to crystallise.

The polymeric layers used for the production of the sheets of our invention are preferably produced by extrusion from a slot or annular die. The thickness of the extruded film will normally be in the region 0.5 to 1.0 inch.

Crystallisation of the layers depends on the temperature and time of heating. For normal rates of continuous handling of polymer sheets temperatures of 80 to 125° C. are appropriate for this treatment, the time required for the treatment being less for higher temperatures. Higher temperatures up to near to the melting point of the polymer (about 245° C.) may be used but in general are not necessary. The crystallinity produced in the sheet should be in the range 10 to 30% (determined on the basis that a theoretical 100% crystallinity would be obtainable).

Heating at the above temperatures for up to one minute is normally adequate to produce the desired level of crystallinity. In particular heating for 3 to 30 seconds may be employed.

So that the sheets which are to be formed into shaped articles have sufficient residual extension beyond their yield point to enable them successfully so to be shaped, it is preferred that they are not drawn more than 3 times in both directions, but so that such sheets have good tensile and impact resisting properties that they are drawn at least 2 times in both directions.

Sheets which are not to be formed into shaped articles should have particularly high tensile yield strengths and moduli and so we prefer that they are drawn at least 3 times in both directions. The maximum draw ratios which can be applied without breaking the layers depends on the molecular weight of the polymer. We measure the molecular weight of the polymer by measuring its relative viscosity as a 1% solution in o-chlorophenol. We prefer that it has such a relative viscosity of at least 1.9 and particularly one of at least 2.0. Such relative viscosities as low as 1.7 are quite satisfactory. However, such relative viscosities above 2.5 are not desirable because unduly high extrusion temperatures are required causing some polymer degradation and also because the cost of producing the polymer is increased. The layers may be drawn as much as 4:1 or more in both directions, the maximum draw ratio depending on the drawing temperature and rate of drawing. The maximum draw ratio that can be applied without breaking the film can be determined by simple experimentation. The sheet may be drawn at a temperature between 70° C. and 200° C. Normally it is not necessary to draw above a temperature of about 150° C. Since the sheets are maintained at a temperature of 80 to 125° C. prior to the drawing operation so as to crystallise the polymer, it is convenient to draw the sheet at a temperature in the region of or greater than that used for crystallisation. The rate of drawing normally employed may be in the range 2,000 to 50,000% per second in the machine and transverse directions. Crystallised sheet requires a lower draw ratio than would uncrystallised sheet to effect an equal degree of orientation as shown by change of refractive index in the direction of drawing and by improvement in the tensile strength of the sheet. Under comparable conditions crystallised layers can usually be drawn to somewhat lower draw ratios than could uncrystallised layers without breaking.

The sheets of our invention may be of the non-tubular and tubular varieties. The former may be made by non-tubular film processes by sliting sheet made by a tubular film process and by cold rolling. Tubular sheet (i.e. pipe) may be made by sealing together the edges of non-tubular sheet. Seamless tubular sheet may be produced by a tubular process.

We find that the layers since they are crystallised before they are drawn can be drawn to higher tensile yield strengths and stiffnesses than could uncrystallised layers. The former present some difficulties in sequential drawing processes in that, if the draw temperatures and ratios are not carefully controlled within restricted limits as specified above highly unbalanced sheet may be produced. In fact, such sheets are most easily produced by simultaneous drawing processes. However, as simultaneous drawing processes are not yet suited to the production of sheets of the best thickness uniformity and flatness, our sheets are also very usefully prepared by drawing sequentially. This last method is also very suitable for the production of transparent sheet particularly when the layers formed for drawing are quenched after extruding at relatively high extrusion temperatures, e.g. from 300° C. to 330° C. preferably from 310° C. to 315° C.

Our sheets exhibit good resistance to ultra-violet light degradation compared with sheets of polyethylene terephthalate.

Various additives, e.g. fillers comprising finely divided particulate materials, dyes, pigments, light stabilisers or antistatic agents may be incorporated in the sheets according to our invention. Examples of suitable fillers include titanium dioxide, silica (including diatomaceous silica), silicates and alumino-silicates e.g. clays, abrasives such as powdered glass or Carborundum and decorative materials such as talc, ground mica or ground mother-of-pearl.

The concentration of the additive and, in the case of solid materials, its particle size will depend on the nature of the additive and the purpose for which the sheet is to be used. For example, in the case of a pigment or dye we prefer the concentration to be from 0.01% to 5.0% by weight. In the case of a filler such as silica or a silicate which confers a matte "write-on" surface to the sheet from 1% to 10% by weight and of particle size from 0.1 to 10 microns may be added. In the case of a substance, e.g. clay, added to improve the slip properties of the sheet the preferred concentration is from 0.05% to 5.0% by weight and the preferred particle size from 0.01 to 10 microns. In the case of decorative materials the preferred concentration of inert filler is from 1% to 15% by weight and the preferred particle size from 1 to 20 microns. In the case of abrasive, e.g. ground glass or Carborundum, concentrations of from 1% to 15% by weight and particle sizes from 0.005 inch to 0.100 inch may be used. For applications where the sheet is subjected to violent mechanical action during forming into shaped articles, e.g. by pressing, stamping or creasing, we find that the use of from 0.25% to 10% by weight of a filler having a particle size range of from 0.1 to 2.0 microns and a very narrow distribution of particle size, e.g. titanium dioxide of particle size approximately 0.2 micron is helpful in making the sheet more resistant to breakdown.

Our sheets may also be laminated to other materials which may or may not be themselves in the form of films or sheets. For example, they may be laminated to wood, to paper, to metals or to other thermoplastics. The sheets so laminated may or may not contain any of the additives listed above and a particularly useful type of laminate is one in which a sheet according to our invention and containing no additive is laminated to a second film or sheet which may be of polyethylene-1,2-diphenoxyethane-4:4'-dicarboxylate, of another polyester, e.g. polyethylene terephthalate or of any other thermoplastic material which second film or sheet contains such an additive. The effect of the additive may thus be obtained without necessarily incurring possibly undesirable other effects, e.g. a matte surface giving a good light dispersing surface may be obtained without unduly increasing the density by laminating an unfilled sheet so that it forms the central layer between two filled films of polyethylene - 1:2 - diphenoxyethane-4:4'-dicarboxylate; or by incorporating a dye or pigment in the outer layer or layers of such a laminate, producing cheaply a coloured sheet.

A further class of laminates are those with thermoplastic materials which are heat sealable. Examples of such laminates are those with polyethylene, polyvinyl acetate, partially hydrolysed polyvinyl acetate, vinyl chloride/vinyl acetate copolymers, ethylene/vinyl acetate copolymers, butadiene/methyl methacrylate copolymers, butadiene/methyl methacrylate/styrene copolymers, methyl methacrylate/methacrylic acid copolymers and copolymers of vinylidene chloride with one or more of acrylonitrile, itaconic acid, acrylic acid or vinyl chloride. Any of the above heat sealable thermoplastics when laminated to our sheets may of course contain any of the additives listed above, but antistatic agents (cationic, anionic or nonionic), antioxidants, dyes, pigments, lubricants, anti-blocking agents, ultra-violet light stabilisers (although because of their high stability to ultra-violet light this is seldom required) and slip agents (finely divided solids or waxes) are among those additives which may conveniently be added to the heat sealable thermoplastic.

The sheets of our invention may also have their surface modified, e.g. by the application of a very thin coating of heat sealable, antistatic or ultra-violet light stabilising material or by the application of a slip coating comprising particulate material, e.g. of silica or alumino silicates, or of thermoplastic polymers such as polyvinyl chloride or polymethyl methacrylate. Slip coatings of polymethyl methacrylate of particle size from 0.1 micron to 2.0 microns are particularly useful since they increase the slip of the sheet without markedly increasing its haziness. The surface may also be modified by embossing, by mechanical roughening or by sand blasting. Very thin reflective coatings of a metal such as aluminium may also be formed on the surface of our sheets. Such metallic coatings may range in thickness from $10^{-7}$ to $10^{-6}$ inches. When such metallic coatings are applied they are normally covered by a thin protective film of a transparent thermoplastic.

The methods used in the production of filled, laminated and surface modified sheets will now be described.

Fillers and other additives which do not undergo any chemical reaction with the polyme or polymer-forming reactants may preferably be incorporated into these materials and the resultant composition extruded to give the additive containing sheet. Such a procedure, especially when applied at the polymerisation stage leads to a more uniform dispersion of the additive in the sheet. Laminates comprising an outer layer or layers containing an additive may be produced by the extrusion through a multi-channel die in which polymer containing additive is fed to one or more channels and polymer without additive to the remaining channels. Such a sheet and process for its production is described in our U.S. Pat. 3,515,626.

Laminates may be formed by first treating the sheets according to our invention with an adhesive such as low molecular weight polyesters and copolyesters used either alone or in conjunction with an isocyanate, and then applying an already formed film of the heat sealable thermoplastic material with the accompaniment of heat and pressure, e.g. between hot nip rollers. Such a process may conveniently be used in laminating our sheets to films of polyethylene or polypropylene, or to metallic foils, e.g. of tin or aluminium.

An alternative method of laminating our sheets to thermoplastic materials and particularly to heat sealable thermoplastic materials is to apply the material to our film as a melt coating, from a solution, or from aqueous dispersion. Although the adhesion of such coatings to the oriented sheets of our invention is high, it may be necessary for particular coatings to pretreat the surface of the oriented sheet to render it more receptive to the coating and thus produce a stronger adhesion between the sheet and the heat seal coat. This may be done by a surface oxidation of the sheet, e.g. by chemical oxidation with, for example, potassium dichromate, chloracetic acid or ozone, by flame treatment of the surface of the film (with or without causing any melting of the film surface), or by corona discharge treatment in air or in another gas or mixture of gases, e.g. chlorine, sulphur dioxide or ozone. Thin coatings of a primer may be applied, e.g. alkyl titanates or polyalkylene imines.

One very effective method of obtaining an oriented sheet, the surface of which is more receptive to a heat seal or other coating, is to apply to the unoriented or partly oriented sheet a coating of a thermoplastic polymer at least fifty times thinner than the thickness of the unoriented sheet, the thermoplastic polymer having a melting point lower than the orientation temperature and having at least one carbon atom with a polar substituent per every six carbons of the polymer chain. Such a process is described in our British Pat. No. 1,127,076 and this process may also be used to apply antistatic agents, ultra-violet stabilisers, antioxidants or slip coats to our sheets, or to improve their receptivity to dyes or printing inks, over the already good characteristics which they have in this regard without such treatment.

To avoid pretreatment of the oriented sheet prior to heat seal coating, the coating may be applied to the unoriented or in the case where the sheet is drawn in more than one stage, to the partly oriented sheet and then the orientation of the sheet carried out or completed. This leads to an excellent adhesion between the sheet and the heat seal coat.

A further method of treating our sheets in order to make them more readily heat sealable is to subject their surface to a flame treatment which may be carried out by passing the oriented sheet to be treated over a chilled roller while applying a flame of intense heat to the upper surface of the sheet for a sufficient time to cause the surface of the sheet to melt but for insufficient time to cause distortion of the sheet. The sheet following this treatment has an amorphous layer on the surface and can thus be heat sealed at a temperature of from 160 to 230° C. and using a pressure of 5 p.s.i. for 2 seconds give heat seal strengths of from 70 to 200 g./inch.

In the following examples of uses for our sheets, where we use the term "gauge" we mean a unit of $10^{-5}$ inches.

They may be used for slot liners and slot closures for electric motors especially when in thicknesses of from 750 gauge to 2,000 gauge. They are particularly useful for this application because of their high permittivity which is about twice that of the corresponding sheet of polyethylene terephthalate. For such a use it may be desirable to add a filler having a low particle size and a narrow particle size distribution, e.g. titanium dioxide of medium particle size 0.2 microns and with 90% of its particles in the range 0.1 to 0.3 microns, since this prevents any tendency to "delamination" or fibrillation during manufacture and insertion of the slot liners and slot closures, especially when highly oriented sheets are used. They may also be used for stiffeners for garments, e.g. collar stiffeners. They may be used in the production of heavy duty ribbon cables or printed circuits or as gaskets, bursting discs or diaphragms in pumps or measuring instruments. They may be laminated with felt or with bitumen to produce high quality roofing felts or damp courses or they may be laminated with wood, paper or metal for use as decorative materials. In the latter cases they preferably contain an inert filler so that they present a matte surface. They may be used as windshields or windscreens or other windows for motor vehicles, aircraft or ships, for any other glazing or double glazing applications or as slats for venetian blinds. When perforated they may be used as a leather substitute, e.g. in the production of boots, shoes, bags, saddles and other leather-substituted goods. They may be used as strapping tapes in thicknesses up to 0.10 inch or measuring tapes being useful for the latter in view of their thermal stability and for conveyor belts, particularly in uses where a high standard of hygiene is required, e.g. in battery chicken houses. They may also be used as facings in moulds, e.g. in the production of shaped articles from fibre glass because of their good properties as releasing agents.

As mentioned above a preferred use for the sheets according to our invention is in constructional panels or as facings for such panels where their dimensional stability over a wide range of temperature makes them particularly useful. Examples of such uses are in the production of furniture and office furniture, e.g. book cases and filing cabinets, household appliances and in vehicle production, e.g. automobiles, buses and aircraft.

A further preferred use particularly for sheets oriented from 2 to 3 times in both directions is, as also mentioned above, for forming into shaped articles either at elevated temperatures (60° C. to 150° C.) by, e.g. hot moulding or vacuum forming or at room temperature by metal working techniques such as pressing, cupping, sinking or ironing. Thus many components for use in automobiles or in electrical apparatus may be formed which retain their shape even under the temperatures encountered, e.g. under a motor car bonnet or in the housing of a radiant or other electrical heater.

The thinner gauges of our sheets, e.g. 750 gauge to 1,000 gauge may be used as a base for photographic materials, e.g. for X-ray photographic plates or other photographic plates.

It will be understood that, since it is difficult to extrude layers more than about 0.5 inch thick, that the maximum orientation possible in a sheet which is of final thickness 0.1 inch will be about 2.25 times in both directions, with correspondingly lesser limitations in maximum orientation of sheets of thickness down to about 0.03 inch.

EXAMPLE 1

Polyethylene-1:2-diphenoxyethane - 4:4' - dicarboxylate having a relative viscosity (measured as a 1% solution in o-chlorophenol) of 2.09 was extruded at a temperature of 280° C. on to a rotating chilled drum maintained at a temperature of 83° C. to give a solidified and concurrently crystallised sheet of thickness 0.16 inch. The drum was rotated so as to chill the sheet on the surface of the drum for a residence time of 20 seconds. The sheet was then drawn in the direction of extrusion (the machine direction) 3.0 times between fast and slow rollers, the sheet being heated beneath infra-red heaters to a drawing temperature of 100° C. The sheet was then preheated to a temperature of 130° C. and transversely drawn 3.0 times at that temperature in a stenter oven. The sheet was not subjected to a heat setting treatment and had a thickness of 0.017 inch. The drawn sheet had good resistance to ultraviolet light degradation as evidenced by exposing the sheet under 65% relative humidity conditions to ultraviolet light from a water cooled Xenon arc lamp according to ASTM designation E239. After two days of exposure the sheet retained 80% of its original tensile break strength and after seven days 60% of its tensile break strength. By comparison a control sheet of polyethylene terephthalate subjected to the same test was reduced to zero break strength after two days exposure. Other properties of the sheet are shown in the attached table.

EXAMPLES 2–6

The same procedure as that described in Example 1 was employed to produce other sheets with variations in the conditions applied being as shown in the table. The sheets produced had substantially the same resistance to ultraviolet light degradation as that produced in Example 1. The other properties of the sheets are shown in the table.

TABLE

| Example | 1 | 2 | 3 | 4 | 5 | 6 |
|---|---|---|---|---|---|---|
| Chill drum temperatures, °C | 83 | 100 | 100 | 80 | 100 | 125 |
| Residence time on chill drum, sec. | 20 | 20 | 20 | 20 | 20 | 30 |
| Thickness of chilled sheet | 0.16 | 0.16 | 0.16 | 0.15 | 0.15 | 0.40 |
| Draw ratio, machine direction | 3:1 | 2.8:1 | 2.0:1 | 1.5:1 | 2.0:1 | 2.0:1 |
| Temperature of draw in machine direction, °C | 100 | 100 | 120 | 120 | 120 | 120 |
| Draw ratio, transverse direction | 3:1 | 2.8:1 | 2.0:1 | 1.5:1 | 2.0:1 | 2.0:1 |
| Temperature of draw in transverse direction, °C | 130 | 130 | 150 | 150 | 150 | 150 |
| Drawn sheet thickness | 0.017 | 0.020 | 0.04 | 0.07 | 0.04 | 0.1 |
| Tensile yield strength×10³, p.s.i. | 18 | 17 | 15 | 13 | 15 | 15 |
| Tensile modulus×10⁵, p.s.i. | 7 | 7 | 6 | 5 | 6 | 6 |
| Shrinkage when heated for 1 minute at 200° C., percent | 3 | 3 | 3 | 2 | 3 | 3 |
| Elongation at break, percent | 98 | 100 | 100 | 130 | 100 | 95 |

What is claimed is:

1. A process for the production of biaxially oriented sheets of polyethylene-1:2-diphenoxyethane - 4:4' - dicarboxylate of thickness 0.0075 to 0.1000 inch in which a sheet of crystallized polyethylene-1:2-diphenoxyethane-4:4'-dicarboxylate is drawn to a substantially equal extent within the range of 1.2 to 4 times its original dimensions in its machine and transverse directions, said drawing being effected at a temperature within the range 70° to 200° C., the sheet being maintained before it is drawn at a temperature within the range 80° to about 245° C. to cause the polymer to crystallize to an extent in the range of 10–30% based on 100% theoretical crystallization.

2. A process according to claim 1, in which the polyethylene-1:2-diphenoxyethane - 4:4' - dicarboxylate has a relative viscosity of from 1.9 to 2.5.

References Cited

UNITED STATES PATENTS 2,995,779  8/1961  Winter _____ 264—289
3,444,141  5/1969  Shima _____ 260—47 C DONALD J. ARNOLD, Primary Examiner H. MINTZ, Assistant Examiner U.S. Cl. X.R.

264—291